(12) United States Patent
Davis et al.

(10) Patent No.: US 8,853,343 B1
(45) Date of Patent: Oct. 7, 2014

(54) THERMOSET COMPOSITIONS FROM PLANT POLYPHENOLS

(71) Applicant: The United States of America as Represented by the Secretary of the Navy, Washington, DC (US)

(72) Inventors: Matthew C. Davis, Ridgecrest, CA (US); Andrew J. Guenthner, Lancaster, CA (US); Jessica J. Cash, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/874,743

(22) Filed: May 1, 2013

Related U.S. Application Data

(60) Provisional application No. 61/647,678, filed on May 16, 2012.

(51) Int. Cl.
 *C08G 63/02* (2006.01)
 *C08G 73/06* (2006.01)
 *C08G 64/00* (2006.01)

(52) U.S. Cl.
 CPC .................................. *C08G 73/065* (2013.01)
 USPC ....................................................... 528/210

(58) Field of Classification Search
 USPC ....................................................... 528/210
 See application file for complete search history.

(56) References Cited

U.S. PATENT DOCUMENTS

| | | | | |
|---|---|---|---|---|
| 3,922,368 | A * | 11/1975 | Klaui et al. | 426/540 |
| 5,260,398 | A | 11/1993 | Liao et al. | |
| 5,406,003 | A * | 4/1995 | Wang et al. | 568/721 |
| 7,439,353 | B2 * | 10/2008 | Matsuo et al. | 536/128 |
| 7,825,169 | B2 * | 11/2010 | Wada et al. | 523/102 |
| 2002/0058778 | A1 | 5/2002 | Konarski et al. | |
| 2012/0165429 | A1 * | 6/2012 | Boutevin et al. | 523/400 |

FOREIGN PATENT DOCUMENTS

| | | |
|---|---|---|
| EP | 2167478 | 3/2010 |
| JP | 01290642 | 11/1989 |
| WO | WO 0055123 | 9/2000 |

OTHER PUBLICATIONS

"High Tg thermosetting resins from resveratrol" Polymer Chemistry (2013), 4(13), 3859-3865 CODEN: PCOHC2; ISSN: 1759-9962; English Received Apr. 4, 2013 Accepted Apr. 25, 2013.*

* cited by examiner

*Primary Examiner* — Terressa Boykin
(74) *Attorney, Agent, or Firm* — James M. Saunders; Charlene A. Haley

(57) ABSTRACT

A process and thermoset resin structures having: number of —OCNs attached to phenyl rings exceeds number of phenyl rings (provides glass transition temperature of 334° C. when combined with flexible bridge); bridge between rings does not hinder rotation and allows maximum rotational degrees of freedom (allows complete cure at temperatures less than 350° C.); and bridge between rings is small enough to maintain cyanurate density and allows for high char yields.

14 Claims, No Drawings

THERMOSET COMPOSITIONS FROM PLANT POLYPHENOLS

CROSS-REFERENCE TO RELATED APPLICATIONS

This is a non-provisional patent application, claiming the benefit of, parent application Ser. No. 61/647,678 filed on May 16, 2012, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to renewable feedstocks, and more particularly, to renewable chemical feedstocks derived from plants.

DESCRIPTION OP EMBODIENTS OF THE INVENTION

The invention generally relates to renewable feedstocks, and more particularly, to renewable chemical feedstocks derived from plants.

Aromatic cyanate ester resins are a unique class of thermosetting polymers that offer a unique combination of low moisture uptake, low dielectric constant, thermochemical stability, and glass transition temperature. Monocyanates (one —OCN group attached to phenyl ring) are not useful for polymerization. Dicyanate esters (two —OCN functional groups attached to phenyl ring(s)) have a majority of polymerizable functional groups: single-ring type (two —OCN groups attached to same phenyl ring)—higher volatility and water uptake limit usefulness as polymerizable species; and "Bisphenol" type (two —OCN groups, each attached to a separate phenyl ring, with a central bridge)—most common type of dicyanate, 2 commercial products, glass transition temperature limited to about 300° C. in practical situations because either 1) the number of —OCN groups per unit volume is lower than needed to achieve glass transition above 300° C., or 2) a more rigid bridge group, which raises glass transition at full cure above 300° C., makes full cure difficult to achieve due to steric hinderance associated with the rigidity of segment between —OCN groups.

Tricyanate esters (& tetracyanate esters, pentacyanate esters, etc.) of more than two —OCN groups attached to phenyl ring, offers a higher density of —OCN groups and therefore are able to achieve glass transition temperatures above 300° C. in practical situation or above 325° C. at full cure. Single ring type (three —OCNs attached to same ring) have high volatility, difficulty controlling reaction, and toxicity concerns limit usefulness for polymerization. Trisphenol type (three —OCNs attached to three separate phenyl rings, also 4 —OCN/4-ring, 5 —OCN/5-ring, etc.) include 1 commercial product, some other examples in literature, cyanurate density limited to same level as bisphenol type dicyanates, needs flexible bridges between all phenyl rings to achieve complete conversion, glass transition temperature limited to 325° C. at full cure in cases where flexible bridges are used. Mixed ring type (two —OCNs attached to same ring, one —OCN on separate ring. Or, for tetracyanates (two —OCNs each on two phenyl rings) this offers higher cyanurate density than trisphenol type, the key is the number of —OCN groups should exceed the number of phenyl rings.

2 —OCN groups having othro-substitution on the same phenyl ring, results in chemically unstable monomer, not used. 2 —OCN groups having para-substitution on the same phenyl ring, results in steric hindrance and inability to completely polymerize. 3 or more —OCN groups on the same phenyl ring, results in steric hindrance and inability to completely polymerize. 2 or more —OCN groups having meta-substitution on the same phenyl ring—the only type of mixed ring system that can polymerize fully (having fused rings—appear in some patent applications, will not achieve complete cure; having hindered rotation between rings (examples, isopropidyl group, COCl$_2$ group, or more than one bridge attached to an aromatic ring having an attached —OCN group)—appear in some patent applications as co-monomers in multi-component formulations, difficult to achieve cure in a single-component formulation; having free rotation between rings—one example other than invention has dimethylsilyl linkages and a low overall —OCN density, another has fewer rotational degrees of freedom than the embodiments of the invention). Two sub-types are: one-carbon bridges (methylene, ethylidene)—not as free to rotate, and two-carbon bridges (ethylene)—more rotational degrees of freedom. These are all monomers with at least 3 —OCN groups attached to phenyl rings, and with the number of —OCN groups exceeding the number of phenyl rings.

JP 01290642 (Hitachi, 1989) describes the formation of cyanate esters for 4 —OCN groups and 2 phenyl rings (both with meta di-substitution), in which there is a single carbon bridge with aliphatic or fluoroaliphatic side groups. Two molecules of this type would have a bridge that allows for free rotation, but based on SciFinder classification, it is not clear if these were actually made. Even these two would have comparatively less rotational freedom than the ethylene bridge found in the resveratrol compound. U.S. Pat. No. 5,260,398 (Liao et al, Dow Chemical) teaches, among many, some cyanate ester monomers having more —OCN groups attached to phenyl rings than phenyl rings, but in which the bridge between phenyl rings contains at least one siloxy group (with at least two attendant carbon atoms). These can be freely rotating or hindered bridges, but the size of the bridge leads to a reduction in the overall number of —OCN groups per unit volume. As a result, the glass transition temperatures of any materials synthesized in the patent do not exceed 290 C. Patent application EP2167478 (WO 2008156443) discloses a tricyanated naphthalene, having 3 —OCN groups on two fused aromatic rings. This fused ring system will not achieve complete cure readily due to steric hindrance (example of 3.3.4.1) The same monomer is included in a list of possible cyanate ester latent hardeners in patent application US 20020058778 and in EP0347800. One other patent application (WO 2000055123) describes unsaturated bridges in cyanate esters containing chlorine or other halogens for flame retardance; these also offer only hindered rotation and will not cure fully.

Embodiments of the invention include structures having: number of —OCNs attached to phenyl rings exceeds number of phenyl rings (provides glass transition temperature of 334° C. when combined with flexible bridge); bridge between rings does not hinder rotation and allows maximum rotational degrees of freedom (allows complete cure at temperatures less than 350° C.); and bridge between rings is small enough to maintain cyanurate density and allows for high char yields.

In embodiments of the invention, the ethylene bridge linking the meta (—OCN di-substituted phenyl ring) to at least one other phenyl —OCN group is the great feature that enables the significant advance in performance.

In embodiments of the invention, two renewable sources of chemical feedstocks were found to contain compounds useful for thermoset compositions which may reduce the dependence on petroleum resources. Applications include aerospace uses requiring high strength-to-weight ratios because the novel materials are lightweight and thermally resistant.

Many composite and polymer materials used in Department of Defense (DoD) applications are derived from crude oil. Foreign supplies of petroleum are the primary source for these chemicals. Efforts that can mitigate or at least decrease DoD dependence on foreign supply of necessary raw materials for essential components will be valuable for long term stability. Embodiments of the invention indicate that biological products from plants can be used to make high-performance materials that could be used for DoD purposes. The products from plants represent renewable chemical feedstocks that can be made into higher value products for the DoD.

In embodiments, plants represent a renewable source of composite materials with only minor chemical modification. Plants have polyphenol compounds called lignans. Plants can be extracted and from these extracts one skilled in the art can isolate particular chemical species. Two examples from the plant kingdom are grapes (*Vitis vinifera*) which grow throughout the world in temperate climates and creosote bush (*Larrea tridentata*) which grows mostly in the arid regions of the southwest USA and northern Mexico. These plants can be extracted and from them isolate resveratrol and dihydroguaiaretic acid (FIG. 1). These two polyphenolic compounds can then be chemically transformed by one skilled in the art into corresponding cyanate esters resveratrol tricyanate and dihydroguaiaretic dicyanate. These two plant-derived compounds can them be readily polymerized simply by heating in a controlled fashion. The resulting thermoset resins have high-heat resistance useful for aerospace applications. Thus, plants such as these represent a renewable source of composite materials with only minor chemical modification.

Thermoset resins apply to anything from monomers up through oligomerized and fully converted material, including mixtures and so forth. Resveratrol tricyante, the networks derived from it; and especially the dihydroresveratrol tricyanate, and the networks derived from it; and even the process for making castings are novel. It was discovered that 0.5 C/min to 240 C works for avoiding an uncontrolled exotherm in this material with an unusually high heat of reaction), regardless of the source. The dihydroresverairol in particular has a unique combination of structural features (three reactive groups, two phenyl rings, and one ethylene bridge) that impart novel processing, mechanical, and thermal properties, and though we proved it only for the cyanate ester, one could reasonably expect it to be true for other classes of thermosetting monomers (benzoxazines, phthalonitriles, maleimides, nadic and norbornenes, phenyl ethynyl, and possibly azides, with epoxies, acrylics, styrenics, and acetylenes doable but with limited usefulness due to their low thermal stability).

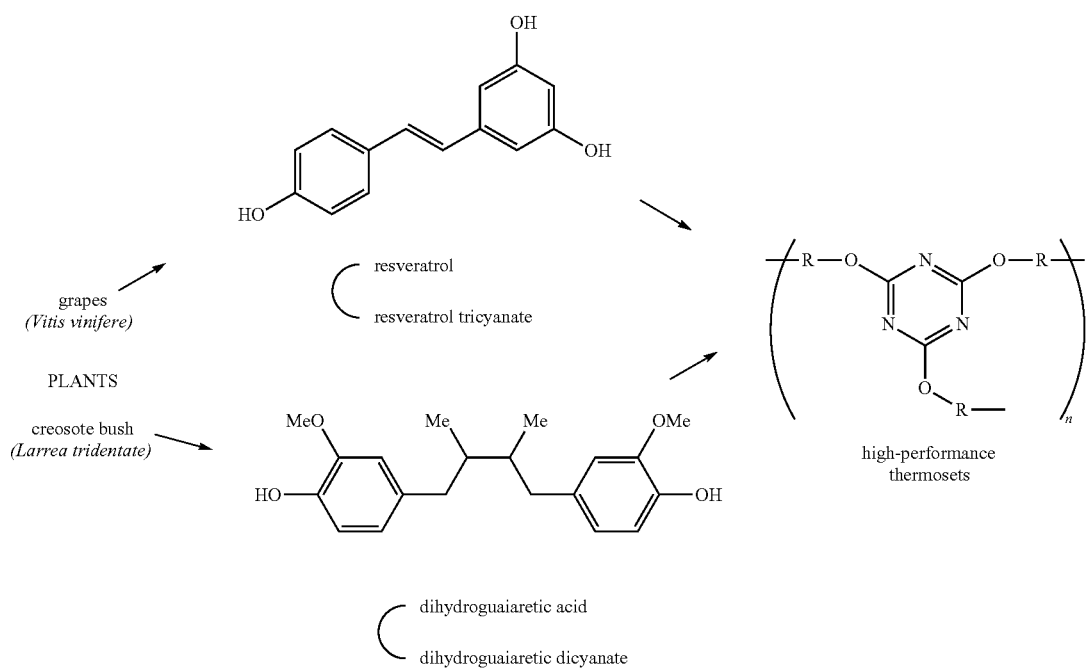

Embodiments of the invention generally relate to processes for making thermoset resins including, extracting polyphenol compounds from at least one plant(s) source having polyphenol compounds, isolating the polyphenols to produce polyphenolic compounds, chemically treating the polyphenolic compounds to produce cyanate esters, and polymerizing the cyanate esters with heat to produce thermoset resins. Other embodiments of the invention generally relate to thermoset resins, resveratrol tricyanates, and dihydroresveratrol tricyanate produced by the process herein.

In embodiments, the polyphenol compounds are, but not limited to, lignans. In embodiments, the plant(s) having polyphenol compounds include, but not limited to, grapes and/or creosote bushes. In other embodiments, the polyphenols compounds includes resveratrol and/or dihydroguaiaretic acid. In embodiments, the cyanate esters include resveratrol tricyanate and/or dihydroguaiaretic dicyanate. In other embodiments, the thermoset resins includes the general formula 1, wherein "n" ranges from 1 to about 1,000,000,000,000,000,000,000,000,000,000.

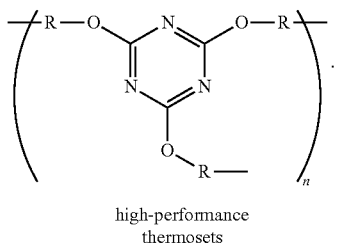

high-performance thermosets

Further embodiments of the invention include the chemical structures below.

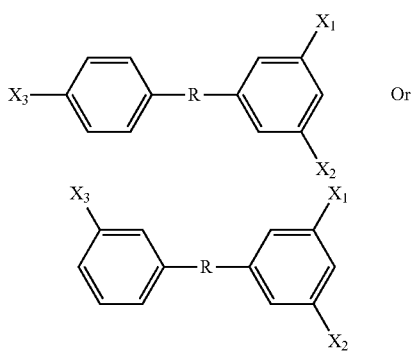

Wherein R=C2Y4, where each Y independently may be —H, —F, —Cl, —Br, or —I; example (C2H2, ethylene), or R=trans-vinylene; and where $X_1$-$X_3$=—OCN (cyanate ester, definitely new), or $X_1$-$X_3$ are each independently selected from glycidyl ether, cyanate ester, or benzoxazine (likely new); note that only R=trans-vinylene may be extracted from a plant, other variants of R require a chemical reaction to transform trans-vinylene to R before transforming —OH to —X.

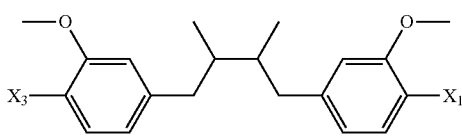

Wherein $X_1$ and $X_2$ are independently selected from glycidyl ether, cyanate ester, or benzoxazine. Note: these are all possible by 1) extraction from a plant 2) chemical treatment (may be multi-step) to yield a reactive monomer, and 3) thermal treatment of reactive monomer with co-reactant (glycidyl ether case only) and/or catalyst (all cases) to yield a macromolecular network polymer. Note that in order to yield the network structure given in claim 6, the reactive monomers must contain at least three fragments of —OCN.

The reactive monomers and the macromolecular networks are also novel even when they are not made by extraction from a plant, but rather by 1) providing resveratrol (or dihydroguaiaretic acid), 2) chemical treatment (may be multi-step) to yield a reactive monomer, and 3) thermal treatment of reactive monomers with co-reactant (glycidyl ether case only) and/or catalyst (all cases) to yield a macromolecular network.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A process for making thermoset resins, comprising:
    extracting polyphenol compounds from at least one plant(s) source having polyphenol compounds;
    isolating said polyphenols to produce polyphenolic compounds;
    chemically treating said polyphenolic compounds to produce cyanate esters, wherein said polyphenolic compounds having a plurality of OCNs attached to phenyl rings exceeding said number of phenyl rings providing glass transition temperatures of above 300° C. upon complete conversion to cyanurate when combined with flexible bridges, wherein said bridges are between said rings that permit rotation and permit maximum rotational degrees of freedom, wherein during curing temperatures are less than about 350° C., and wherein said bridge between said rings maintain cyanurate density and permit for high char yields; and
    polymerizing said cyanate esters with heat to produce thermoset resin network(s), wherein said thermoset resins is the general formula 1, wherein "n" ranges from 1 to about 1,000,000,000,000,000,000,000,000,000,

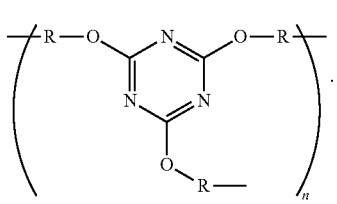

high-performance thermosets

2. The process according to claim 1, wherein said polyphenol compounds are lignans.

3. The process according to claim 1, wherein said plant(s) having polyphenol compounds include grapes and/or creosote bushes.

4. The process according to claim 1, wherein said polyphenolic compounds comprises resveratrol and/or dihydroguaiaretic acid.

5. The process according to claim 1, wherein said cyanate esters comprises resveratrol tricyanate and/or dihydroguaiaretic dicyanate.

6. Thermoset resin networks produced by the process in claim 1.

7. Resveratrol tricyanate produced by the process in claim 1.

8. Dihydroresveratrol tricyanate produced by the process in claim 1.

9. A process for making thermoset resins, comprising:
isolating resveratrol or dihydroguaiaretic acid to produce polyphenolic compounds; and
chemically treating said polyphenolic compounds to produce cyanate esters, wherein said polyphenolic compounds having a plurality of OCNs attached to phenyl rings exceeding said number of phenyl rings providing glass transition temperatures of above 300° C. upon complete conversion to cyanurate when combined with flexible bridges, wherein said bridges are between said rings that permit rotation and permit maximum rotational degrees of freedom, wherein during curing temperatures are less than about 350° C., and wherein said bridge between said rings maintain cyanurate density and permit for high char yields, and wherein said cyanate esters including resveratrol tricyanate or dihydroresveratrol tricyanate thermoset resin networks.

10. The process according to claim 9, further comprising polymerizing said cyanate esters including resveratrol tricyanate or dihydroresveratrol tricyanate with heat to produce thermoset resins.

11. A compound, comprising:
the general formula 2 or 3

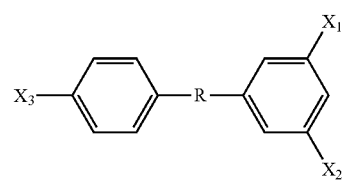
Formula 2

Or

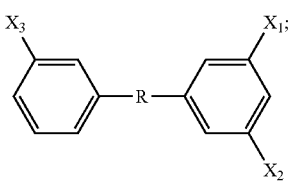
Formula 3 and wherein said R is C2Y4, wherein each said Y independently is selected from the group consisting of —H, —F, —Cl, —Br, and —I; wherein said $X_1$-$X_3$ are each independently selected from the group consisting of glycidyl ether, cyanate ester, and benzoxazine.

12. The formulas according to claim 11, wherein said R is ethylene or R is trans-vinylene.

13. The formulas according to claim 11, wherein said R is trans-vinylene may be extracted from a plant and other variants of said R require a chemical reaction to transform trans-vinylene to R before transforming —OH to —X.

14. A compound, comprising:
the general formula 4

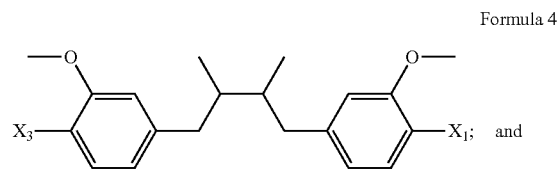
Formula 4 and wherein said $X_1$ and $X_2$ are independently selected from glycidyl ether, cyanate ester, or benzoxazine.

* * * * *